United States Patent [19]

Sadar

[11] Patent Number: 5,777,011

[45] Date of Patent: Jul. 7, 1998

[54] STABILIZED FORMAZIN COMPOSITION

[75] Inventor: Michael J. Sadar, Fort Collins, Colo.

[73] Assignee: Hach Company, Loveland, Colo.

[21] Appl. No.: 566,166

[22] Filed: Dec. 1, 1995

[51] Int. Cl.$^6$ .................. C08J 5/10; C08K 3/20
[52] U.S. Cl. ............... 524/253; 524/251; 524/252; 524/423
[58] Field of Search ..................... 524/423, 251, 524/252, 253

[56] References Cited

U.S. PATENT DOCUMENTS

| | | | |
|---|---|---|---|
| 3,960,493 | 6/1976 | Beitz et al. | 23/230 B |
| 4,291,980 | 9/1981 | Patterson | 356/243 |
| 5,093,444 | 3/1992 | Uchida et al. | 526/233 |

OTHER PUBLICATIONS

"The Preparation of Formazin Standards For Nephelometry". Rice, Analytica Chimica Acta, 87 (1976) 251–253.

*Primary Examiner*—Vasu Jagannathan
*Assistant Examiner*—U. K. Rajguru
*Attorney, Agent, or Firm*—Dean P. Edmundson

[57] ABSTRACT

Stabilized formazin compositions suitable as turbidity standards. The compositions can be prepared by diluting a concentrated formazin composition with a diluent containing hexamethylenetetramine and, optionally, a water-soluble sulfate salt such as sodium sulfate. The pH of the stabilized compositions is in the range of about 7 to 11.

12 Claims, 4 Drawing Sheets

STABILIZED FORMAZIN COMPOSITION

FIELD OF THE INVENTION

This invention relates to formazin compositions (sometimes called formazin solutions). More particularly, this invention relates to formazin solutions which are used as standards in the measurement of turbidity of liquids. Even more particularly, this invention relates to techniques and methods for preparing stabilized formazin solutions which are very stable over long periods of time.

BACKGROUND OF THE INVENTION

Turbidity measurement plays an important role as an indicator of water quality. Finding a suitable calibration standard for turbidimetric measurement has challenged analysts since the early 1900s. Early turbidity standards included silica, Fuller's earth, diatomaceous earth and acid washed stream-bed sediments. The early standards were quickly rejected because they lacked repeatability and stability. More recently, standards of latex particle suspensions, styrene divinylbenzene microspheres and metal oxide gels have been proposed as turbidity standards. However, a white polymer, known as formazin, has been recognized as the only true primary standard available for turbidity calibration since the 1960s.

Kingsbury et al. first proposed formazin in 1926, and it became widely accepted as a turbidity calibration standard by the 1970s. In the 13th edition of *Standard Methods for the Examination of Water and Wastewater* (1971), the American Public Health Association and the American Water Works Association accepted formazin as the primary standard for turbidity. The U.S. Environmental Protection Agency also recognizes formazin as the primary turbidity standard in methods for the Chemical Examination of Water and Wastes.

FIG. 1 shows the condensation reaction for the formation of formazin. Formazin is an aqueous suspension of an insoluble polymer formed by the condensation reaction between hydrazine sulfate and hexamethylenetetramine.

Formazin, the widely-used primary turbidity standard, degrades quickly when diluted to workable turbidity values (in the range of 0–100 NTU) using ultra-low turbidity water. However, formazin maintains its turbidity value for one year at a concentration of 4000 NTU, where residual reactants and reaction intermediates (largely hexamethylenetetramine and sulfate) compose the polymer's matrix. Dilutions with ultra-low turbidity water, which dilute the matrix of the formazin appear to aid in the degradation of the polymer.

The preparation of formazin, as outlined in the 19th Edition of *Standard Methods for the Examination of Water and Wastewater*, requires a solution of 10 g/L hydrazine sulfate and a solution of 100 g/L hexamethylenetetramine. The two solutions are mixed in equal volumes. A white polymer suspension forms while the mixture stands for 24 hours at 25° C. Upon 1:10 dilution with ultra-low turbidity water, the suspension has a turbidity of 400 Nephelometric Turbidity Units (NTU). Lower turbidity standards require dilution of the stock 400 NTU solution with ultra-low turbidity water, and are reproducible within ±2% of reading. The 400 NTU formazin suspension remains stable for one month, but working standards of lower turbidity degrade after one week or less. Below 40 NTU, the standards must be used immediately after preparation because degradation occurs in a day or less. More dilute standards degrade most quickly.

In this context, "stable" requires some explanation. "Stable" does not refer to the settling of the formazin polymer. In all formazin suspensions, the polymer falls out of suspension over time, and the standard must be mixed by inversion before each use. A formazin standard is "stable" for a period of time if it stays within five percent of its original turbidity value during the time period, assuming that the standard is mixed before each use. Degradation refers to a decrease in the turbidity value of the standard, assuming that the standard is mixed before each use. Coagulation, which results from the hydrolysis of the formazin polymer, is the most likely cause for degradation. A turbidity standard other than formazin is "stable" if, when used according to its instructions for use, it stays within five percent of its original turbidity reading during a specified time period. To ensure prolonged stability, all standards used in stability studies should be stored in sealed containers away from direct light exposure.

Although use of formazin solutions demonstrates excellent reproducibility of turbidity results, preparing new dilutions daily or weekly is inconvenient for many analysts. Consequently, several "alternative" calibration standards have been proposed, including styrene divinylbenzene microspheres, latex suspensions and metal oxide gels. Alternative standards are easy to use because they are stable and they often require no dilutions. However, they cannot be prepared in the laboratory and they must be demonstrated to be traceable to formazin for regulatory reporting purposes. Secondly, alternative standards are instrument-specific and usually can only be traced to one instrument. Thus, different turbidity values for a single standard will result on different instruments, which further mandates continuous tracing of this type of standard to the formazin primary standard. Also, alternative standards do not meet the chemical definition of a primary standard.

The qualities desired in a primary turbidity standard are:

1. accuracy and repeatability equal to or better than formazin,
2. stability for at least one year after preparation,
3. easy preparation from readily available, NIST traceable chemicals,
4. no need for matching (tracing) to formazin,
5. low health risk, and
6. consistency in readings for all types of instruments (including ratio and non-ratio instruments).

E. W. Rice et al., in Analytica Chemic Acta, 87 (1976) pp. 251–253, there is a description of the preparation of a supernate solution composed of 5% hexamethylenetetramine and 0.2% sulfuric acid. This solution was used to dilute a 4000 NTU formazin composition to prepare lower NTU formazin standards which were stable for approximately one month. The pH of such standards has been calculated to be far below 6.5 (the pH of fresh formazin concentrate). After about one month the standards slowly degrade and become colored (light yellow). The formation of color in the standards causes a severe negative interference in turbidity calibrations.

There has not previously been available a turbidity standard which satisfies all of the qualities listed above.

SUMMARY OF THE PRESENT INVENTION

In accordance with the present invention there is provided a new turbidity standard which satisfies all of the qualities listed above which are desired in a primary turbidity standard. The new standards are prepared in accordance with a particular procedure which does not change the formazin polymer itself, and the new standards maintain the accuracy, repeatability and light scatter qualities of traditional formazin standards.

The new standards are prepared from readily available chemicals, and they require no matching to traditional formazin. Most importantly, the new standards remain stable for longer than one year and do not change color. The term "stable" means that the standard stays within five percent of its original turbidity reading during a particular time period, assuming that the standard is mixed before each use. The new standard settles out of suspension just like traditional formazin, and the new standard must be mixed by inversion before each use. The stability of the stabilized formazin directly decreases the health risk associated with traditional formazin because the user only needs to prepare the new standards once every year. In addition, the stability allows for low turbidity formazin standards to be prepared commercially, thus eliminating direct exposure to the user. The new formazin standard is sometimes referred to herein as "stabilized formazin" or "stable formazin".

In accordance with the present invention it has been found that the conventional 4000 NTU formazin composition can be used to make low-turbidity dilutions by maintaining the matrix found in the concentrated standard. Specifically, diluting concentrated formazin composition (4000 NTU) with a hexamethylenetetramine solution (with or without sulfate) allows even low-turbidity standards to maintain their turbidity values (or "remain stable") to within five percent for longer than one year. "Stabilized formazin" can be prepared repeatably and accurately, and it performs as well as traditional formazin as a turbidity calibration standard.

Other advantages of the techniques of this invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
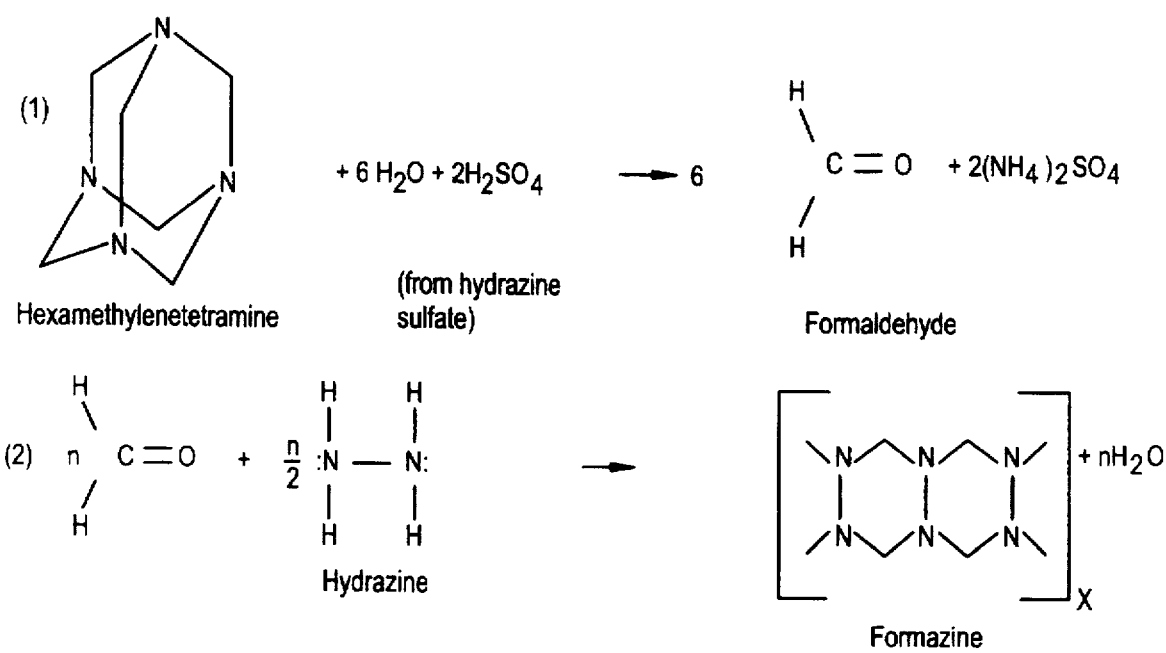
FIG. 1 is the reaction scheme for the preparation of formazin polymer.

Stabilized formazin standards can be made by diluting a concentrated (4000 NTU) formazin standard distributed by Hach Company. The concentrated Hach formazin solutions were all compared to formazin made according to the 18th edition of *Standard Methods for Examination of Water and Wastewater* to ensure accuracy. In all cases, the reagents used to make formazin (hexamethylenetetramine and hydrazine sulfate), are primary standard grade reagents (assayed>99%). All standards are prepared using acid-washed Class A volumetric glassware.

The reagent water used in all testing is tap water passed through ion exchange columns and then through a reverse osmosis filter. The reagent water has a turbidity of 0.025 NTU or less. The reagent water is also referred to as ultra-low turbidity water.

The instructions in each instrument manual are followed for calibration and measurement. Silicone oil is applied to all sample cells to reduce light scatter from sources other than the sample.

Preparation of stabilized formazin requires a 4000 NTU stock aqueous solution of traditional formazin. Using a commercially available 4000 NTU formazin solution from Hach Company is recommended, but other accurate 4000 NTU formazin standards are also acceptable (including formazin made according to the procedure in *Standard Methods for the Examination of Water and Wastewater*).

Twenty-six milliliters of the 4000 NTU standard are diluted to 250 milliliters with "hexamethylenetetramine diluent" to obtain a 400 NTU stabilized formazin standard. Hexamethylenetetramine diluent is an aqueous solution containing 50 g/L hexamethylenetetramine and a water soluble sulfate salt such as 5.38 g/L sodium sulfate. The diluent should be filtered to low turbidity through a 0.2 nm filter before use. After filtering, the hexamethylenetetramine diluent must have a turbidity less than 0.06 NTU, or it should be re-filtered. Lower turbidity standards require volumetric (linear) dilution of the stock 400 NTU solution with filtered hexamethylenetetramine diluent. Stabilized standards remain stable for longer than one year, even at low turbidity levels.

The pH of the stabilized formazin standards must be in the range of about 7 to 11 in order to obtain the desired long-term stability. The hexamine is a weak base and will result in making the composition basic when added in the concentration range of 50 to 200 g/L. The addition of other bases to increase the pH of the composition can be done, but the use of hexamine is preferred.

In the stabilized formazin compositions of the invention the composition's matrix remains colorless and the formazin polymer remains white for at least a year or longer.

It is preferable to include a sulfate salt in the stabilized formazin compositions to further enhance the long-term stability of the compositions. Several different types of water-soluble sulfate salts can be used for this purpose, including sodium sulfate, potassium sulfate, ammonium sulfate, magnesium sulfate, etc. Sodium sulfate is preferred because (1) it readily dissolves in solution, and (2) the sodium cation is small and this results in less attenuation of light as compared to a larger ion.

Preferably the diluent solution used for diluting 4000 NTU formazin composition includes hexamethylenetetramine and the sulfate salt in an aqueous solution. When this solution is added to the concentrated formazin stock composition, the intent is to dilute the formazin polymer while keeping the supernate matrix the same. The concentration of the hexamethylenetetramine in the diluent solution should be in the range of about 50 to 200 g/L. At 50 g/L the hexamine concentration matches that of the 4000 NTU formazin stock composition. In addition, the refractive index matches that of the concentrated polymer. Also, at 50 g/L hexamine the pH is higher than the stock composition, resulting in very little hydrolysis of the formazin polymer and a more stable composition. Above 50 g/L, the pH continues to increase and the composition is very stable. However, as the hexamine concentration in the composition increases, the refractive index continues to differ as well. The refractive index change then becomes significant and leads to non-linearity in preparing stabilized dilutions.

Figure 2:
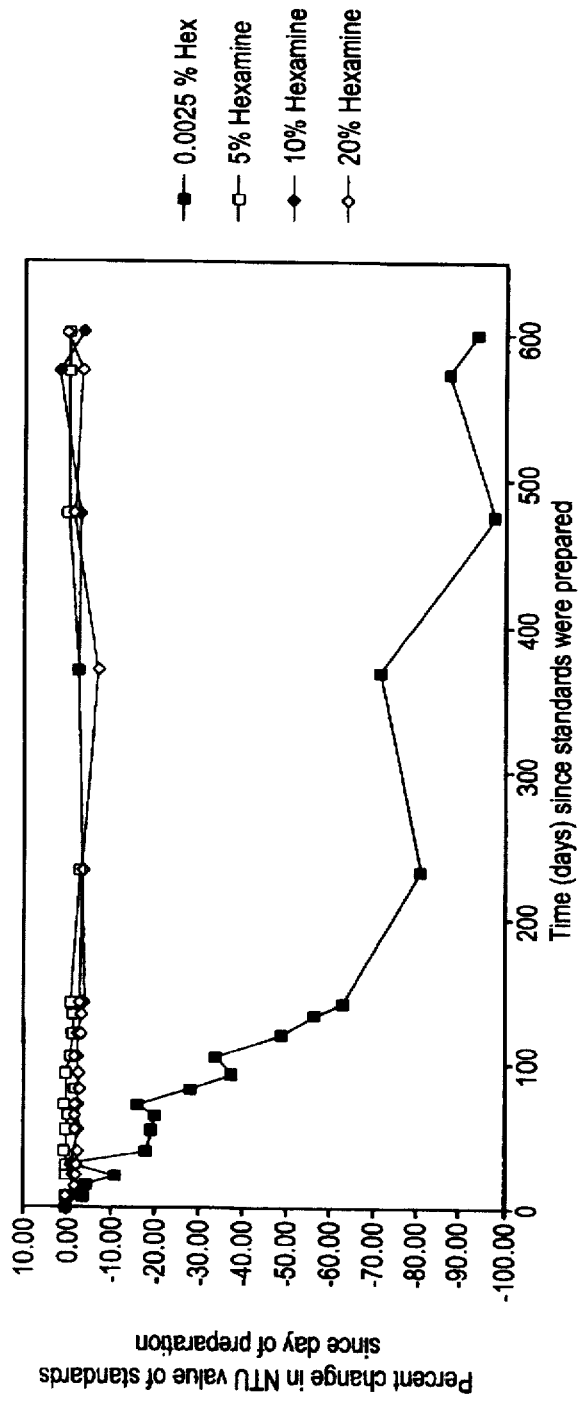
FIG. 2 is a graph showing the effect of different concentrations of hexamethylenetetramine (sometimes referred to as Hexamine) on stability of a 2 NTU stabilized formazin solution.

The graph of FIG. 2 shows the turbidity change in a 2 NTU formazin standard over time. Compositions containing 5 to 20% by weight hexamine show relatively little change in turbidity. The composition containing 0.0025% hexamine was prepared by diluting the 4000 NTU composition using only ultra-pure water as the diluent; the resulting composition degraded immediately and significantly after preparation.

Figure 3:
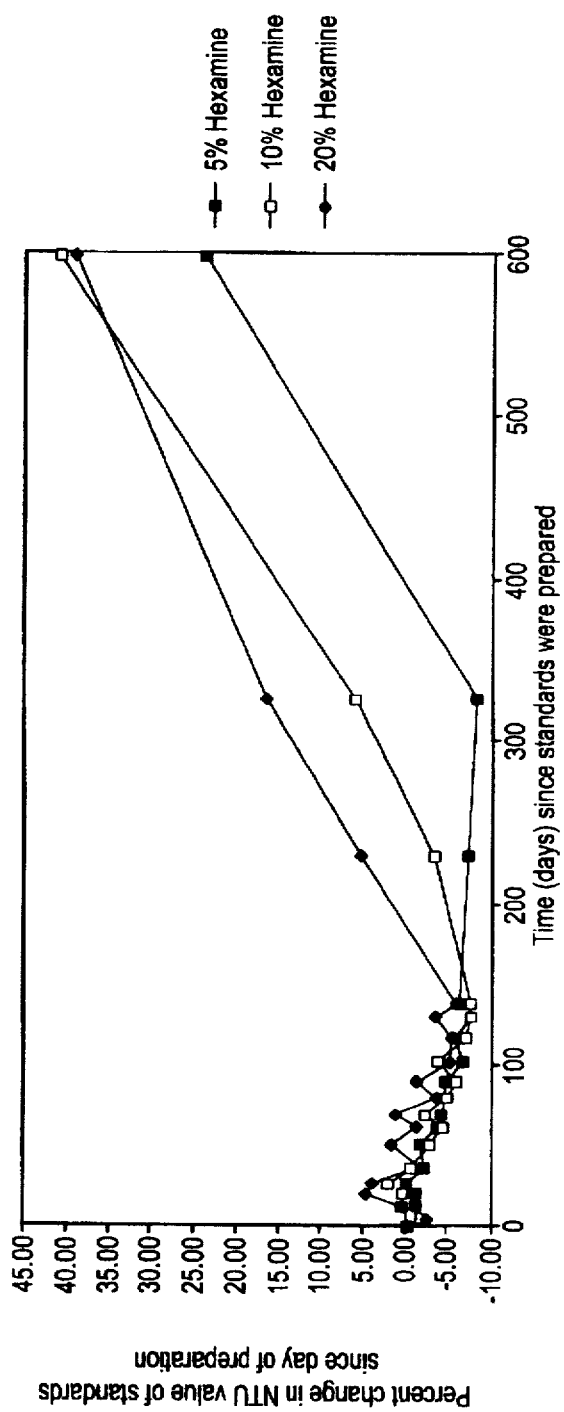
FIG. 3 is a graph showing the change in NTU value of the compositions shown in FIG. 2 at a pH of 6.4.

The graph of FIG. 3 illustrates the same array of 2 NTU compositions as shown in FIG. 2 except that the pH of each composition was lowered to 6.4 using sulfuric acid. Over the first 150 days of the study, degradation of stability occurs to the extent of about 5–10%. After 150 days a significant increase in turbidity values is observed. This is the result of an interference developing in which the test samples were becoming colored. Color increase causes an increase in turbidity readings.

Figure 4:
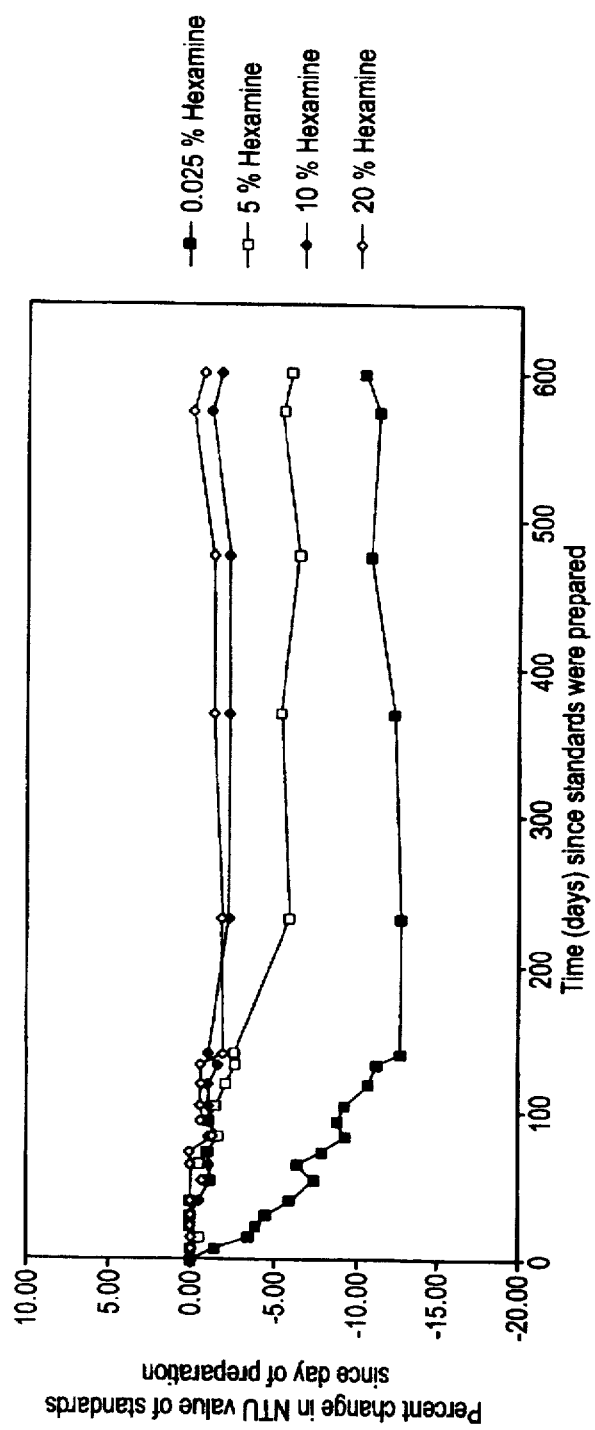
FIG. 4 is a graph showing the effect of different concentrations of hexamine on stability of a 20 NTU stabilized formazin solution.
Figure 5:
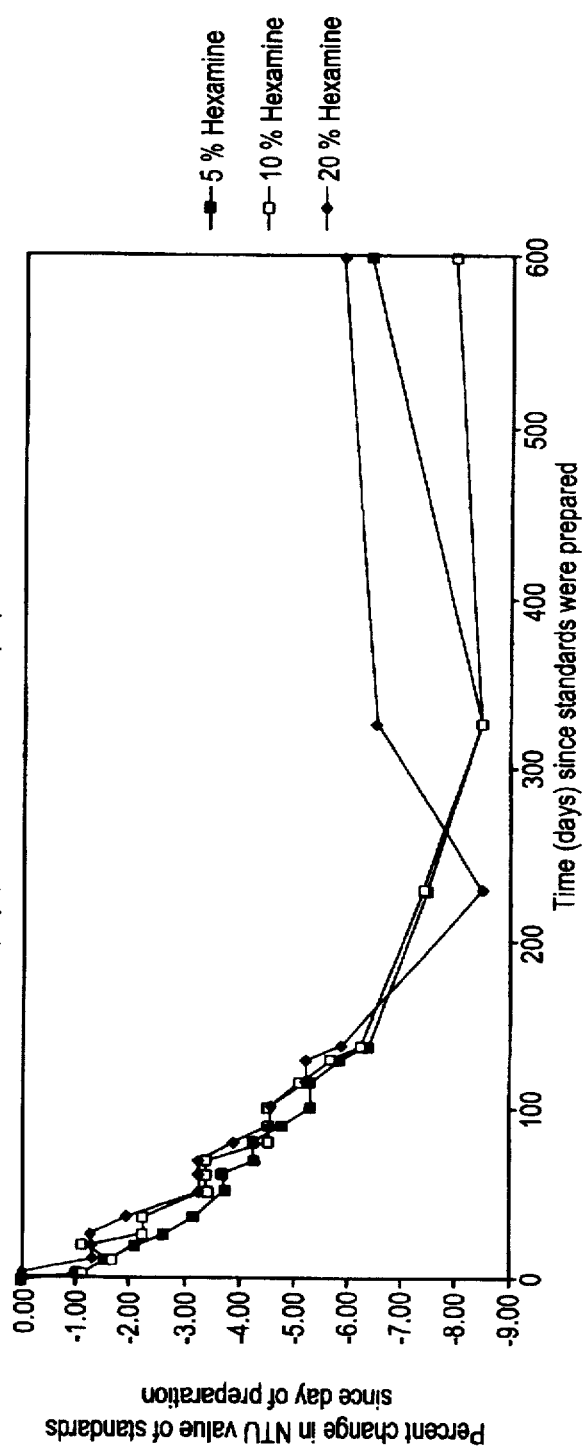
FIG. 5 is a graph showing the change in NTU value of the compositions shown in FIG. 4 at a pH of 6.4.

The graph of FIG. 4 shows the turbidity change in a 20 NTU formazin composition over time. The graph of FIG. 5 shows the turbidity change of the compositions shown in FIG. 4 which have been adjusted to a pH of 6.4 with sulfuric acid.

Figure 6:
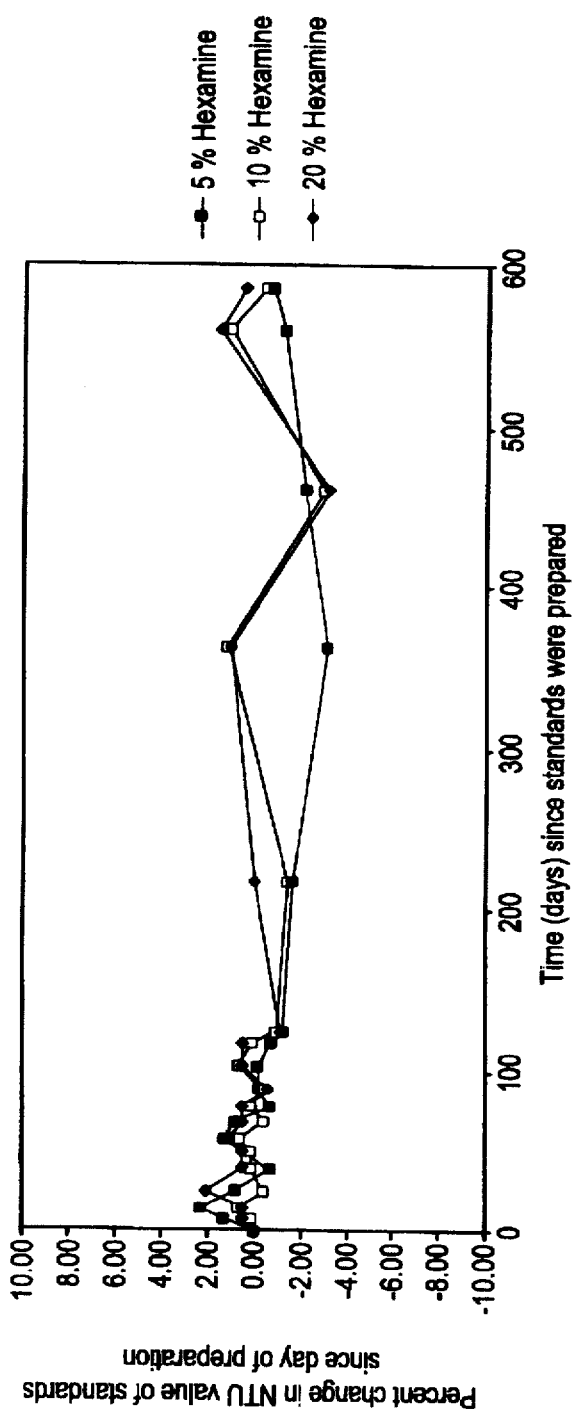
FIG. 6 is a graph showing the effect of sodium sulfate added to a 2 NTU stabilized formazin solutions with varying concentrations of hexamine present.

The graph of FIG. 6 shows the turbidity change in a 2 NTU formazin composition wherein sodium sulfate was included in the hexamine diluent solution used to prepare the compositions. The concentration of the sulfate ion is the same in each composition.

Figure 7:
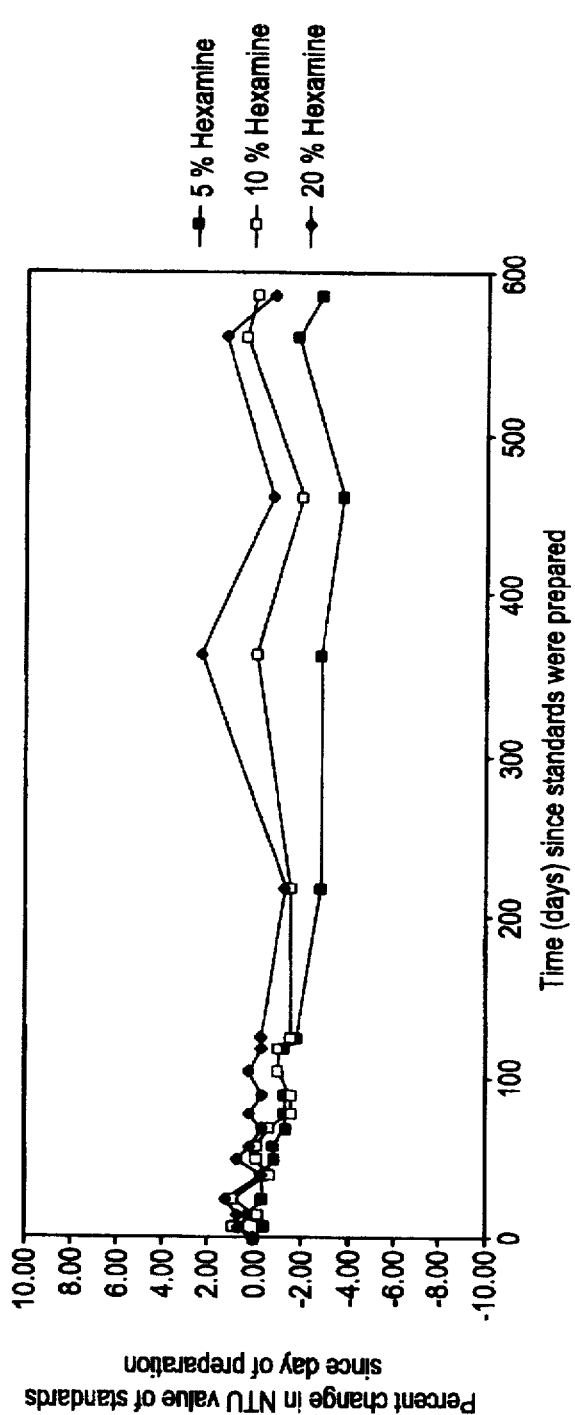
FIG. 7 is a graph showing the effect of sodium sulfate added to 20 NTU stabilized formazin solutions with varying concentrations of hexamine present.

The graph of FIG. 7 shows the turbidity change of 20 NTU formazin compositions wherein sodium sulfate was included in the hexamine diluent solution used to prepare the compositions. The concentration of the sulfate ion is the same in each composition.

EXAMPLE 1

A formazin composition (4000 NTU) is prepared having the following ingredients in the amounts shown.

| Component | Weight % |
| --- | --- |
| Formazin polymer | 0.21573 |
| Formaldehyde | 0.11539 |
| Ammonium sulfate | 0.50800 |
| Hexamine | 4.73100 |
| Water | 94.49300 |

The sulfate in concentration in the composition is 0.36929%.

EXAMPLE 2

A diluent solution is prepared having the following ingredients in the amounts shown.

| Components | Weight % |
| --- | --- |
| Hexamine | 5.000 |
| Sodium sulfate | 0.5380 |
| Water | 94.4620 |

The sulfate ion concentration in this solution is 0.36328%.

EXAMPLE 3

A stabilized formazin composition (400 NTU) is prepared by means of a non-linear dilution of the composition of Example 1 (4000 NTU) with the diluent solution of Example 2. A portion (26.00 ml) of the 4000 NTU formazin composition is diluted to a total volume of 250 ml using the diluent solution. Thus, the components in the 4000 NTU composition are diluted to 10.4% of their original concentration. The resulting composition has the following ingredients in the amounts shown.

| Component | Weight % |
| --- | --- |
| Formazin | 0.022436 |
| Formaldehyde | 0.012001 |
| Ammonium sulfate | 0.052832 |
| Sodium sulfate | 0.482048 |
| Hexamine | 4.972024 |
| Water | 94.46522 |

The total sulfate ion concentration in the composition is 0.363903%. The pH of the composition is greater than 7.

EXAMPLE 4

A stabilized formazin composition (40 NTU) is prepared by a 1:10 dilution of the 400 NTU stabilized composition of Example 3 using the diluent solution of Example 2. The resulting composition has the following ingredients in the amounts shown.

| Component | Weight % |
| --- | --- |
| Formazin | 0.002244 |
| Formaldehyde | 0.0012 |
| Ammonium sulfate | 0.005283 |
| Sodium sulfate | 0.532205 |
| Hexamine | 4.997202 |
| Water | 94.46232 |

The sulfate ion concentration in the composition is 0.363343. The pH of the composition is greater than 7.

What is claimed is:

1. A shelf-stable aqueous formazin composition having a pH not less than 7 and exhibiting an NTU less than 400, said composition comprising:

(a) 100 parts by weight water;
    (b) up to about 0.03 parts by weight formazin polymer;
    (c) up to about 0.4 part by weight of sulfate ion;
    (d) 4 to about 20 parts by weight hexamethylenetetramine.

2. A composition in accordance with claim 1, wherein said sulfate ion is provided by a salt selected from the group consisting of sodium sulfate, potassium sulfate, ammonium sulfate, and magnesium sulfate.

3. A composition in accordance with claim 2, wherein said salt comprises sodium sulfate.

4. A composition in accordance with claim 1, wherein said ion is provided by sodium sulfate in an amount of about 0.03 to 0.4 parts by weight.

5. A composition in accordance with claim 1, wherein said hexamethylenetetramine is present in an amount of about 4 to 10 parts by weight.

6. A shelf-stable aqueous formazin composition having a pH in the range of about 7 to 11 and exhibiting an NTU less than 40, said composition comprising:

(a) 100 parts by weight water;
(b) up to about 0.003 parts by weight formazin polymer;
(c) up to about 0.4 part by weight sulfate ion;
(d) 4 to about 20 parts by weight hexamethylenetetramine.

7. A composition in accordance with claim 6, wherein said sulfate ion is provided by a salt selected from the group consisting of sodium sulfate, potassium sulfate, ammonium sulfate, and magnesium sulfate.

8. A composition in accordance with claim 7, wherein said salt comprises sodium sulfate.

9. A composition in accordance with claim 6, wherein said ion is provided by sodium sulfate in an amount of about 0.003 to 0.4 part by weight.

10. A method for preparing a shelf-stable aqueous formazin composition with an NTU less than 400 and a pH in the range of 7 to 11, comprising the steps of:
 (a) providing 100 parts by weight of an aqueous formazin stock composition having an NTU greater than 400; and
 (b) adding to said stock composition 4 to 20 parts by weight hexamethylenetetramine.

11. A method in accordance with claim 10, wherein said hexamethylenetetramine is present in a aqueous solution containing up to about 0.4 part by weight sulfate ion.

12. A method in accordance with claim 11, wherein said sulfate ion comprises sodium sulfate.

* * * * *